United States Patent Office 3,306,933
Patented Feb. 28, 1967

3,306,933
BIS(HYDROXYALKYL AND CARBOXYALKYL CARBORANYLALKYL) ETHERS
Daniel Grafstein, Morristown, Calvin Vogel, Lake Hiawatha, Sidney I. Karlan, Nutley, and Marvin M. Fein, Westfield, N.J., assignors to Thiokol Chemical Corporation, Bristol, Pa.
No Drawing. Filed Mar. 28, 1963, Ser. No. 269,838
6 Claims. (Cl. 260—535)

The present invention relates to novel compounds containing boron and to methods for making the same.

In recent years, there has been considerable interest in boron-containing compounds because the high heat of combustion of these compounds adapts them for rocket fuel. According to the present invention, boron compounds have been prepared, which compounds are useful for the preparation of polymeric materials that have exceptional value as propellant binders. Moreover, the compounds of the present invention are themselves useful as high-energy fuels and as fuel additives, or as intermediates for the preparation of such fuels or additives. Solid products of this invention, either per se or after formation into a polymer, can be used as solid propellants for rocket power plants and other jet-propelled devices when mixed with suitable oxidizers such as ammonium, potassium, or sodium perchlorate, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron compounds and oxidizers with a curable polymer, for example, of the polyethylene, polyurethane, polyester, or polyether types.

Other products of the invention may be used as additives in high energy liquid fuels by mixing the products with combustible liquids such as compatible hydrocarbon fuels.

The boron-containing compounds of the invention may all be considered derivatives of carborane, which is a compound of carbon, hydrogen, and boron, having the empirical formula $C_2H_{12}B_{10}$. Carborane is a solid material melting at 287°–288° C. It is characaterized by a surprisingly stable nuclear structure and two labile hydrogen atoms, one connected to each carbon atom. It may be conveniently represented by using the formula H$\theta$H. While there is some difference of opinion as to the molecular structure of carborane, its stability is usually attributed to a basket-shaped molecular configuration in which the ten boron atoms and two carbon atoms may be arranged at the apices of an incosahedron.

The method of the present invention comprises reacting a bis(12-carboranylalkyl)ether with an organo-lithium compound so that the labile hydrogen on the bis(12-carboranylakyl)group is replaced by a lithium atom to form lithiated bis(carboranylalkyl)ethers:

$$H\theta R_2OR_3\theta H + 2R'Li \rightarrow Li\theta R_2OR_3\theta Li + 2R'H$$

where R' is alkyl and $R_2$ and $R_3$ are alkylene.

This lithium-substituted ether may be reacted with an alkylene oxide, e.g., an epoxy compound like ethylene oxide, propylene oxide, etc. to form chain-extended lithium alcoholates of bis(carboranylalkyl)ethers. In this latter reaction, a cleavage of the ring structure of the epoxy compound occurs between the oxygen atom and an adjacent carbon atom whereupon the oxyalkyl molecule is left with two reactive sites. These sites are satisfied when the Li+ ions on the aforementioned lithium-substituted ether combine with the oxygen atom of the radical and the resulting reactive sites on the carboranyl ether combine with the carbon atom of the radical. Thus, the epoxy material is incorporated into the molecule of the original lithium-substituted ether:

where $R_1$ is the divalent hydrocarbon radical of the epoxy compound, such as an ethylene or butylene radical.

Hydrolysis of the resulting compound, for example by acidification, causes the replacement of the lithium ion with hydrogen to form alcohols. The final product is an ether alcohol which may be represented by the formula $$HOR_1\theta R_2OR_3\theta R_1OH$$

where $\theta$ is a carboranyl group which may be represented by the formula $C_2H_{10}B_{10}$ or

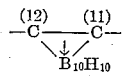

wherein the two carbon atoms are numbered 12 and 11 as shown and the generalized, delocalized pi-bonding is as indicated between the carbon and boron atoms. $R_1$, $R_2$ and $R_3$ are hydrocarbon groups contributed from the epoxy reactant and the bis ether. Conveniently, $R_2$ and $R_3$ contain 1 to 4 carbon atoms and preferably 1 to 2 carbon atoms; $R_1$ conveniently contains 2 to 5 carbon atoms and preferably 2 to 4 carbon atoms.

The method of the present invention can be illustrated by the reaction between bis(12-carboranylmethyl)ether and an epoxy compound. The product of such as a reaction is of the formula $$(HOR_1\theta CH_2)_2O$$

where $\theta$ and $R_1$ have the same definitions as given above.

For example, bis(12-carboranylmethyl)ether can be reacted with ethylene oxide to form a product of the formula $$(HOCH_2CH_2\theta CH_2)_2O$$

where $\theta$ represents the $C_2H_{10}B_{10}$ group.

In another embodiment of the present invention, the aforementioned ether-alcohols may be oxidized with conventional oxidizing agents such as chromates, permanganates etc., to form compounds wherein terminal methoxy groups of the aforementioned products are replaced with carboxylic acid groups. Representative chemical reactions illustrating the process, including the oxidation of terminal methoxy groups to form the diacid compounds are as follows:

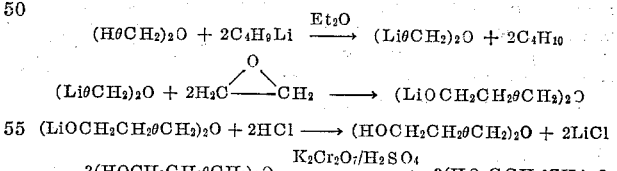

$\theta$ represents the $C_2H_{10}B_{10}$ group in the above reaction.

The preparation of the bis(12-carboranylalkyl)ethers reacted according to the present invention is described in the copending Fein et al. application Serial No. 269,848 filed March 28, 1963, now U.S. Patent 3,247,256, granted April 19, 1966. This preparation comprises reacting an alkyl ether containing acetylenic bonds with a co-ordination compound of decaborane and a material such as ethyl sulfide or acetonitrile. This co-ordination compound is formed by reacting 2 moles of ethyl sulfide or acetonitrile, which are basic materials in the sense that they can donate electrons to aid formation of a chemical bond, with decaborane. This latter reaction is suitably carried out in a solvent medium such as one consisting of one-half dioxane and one-half toluene. The acetylenic ether is conveniently added to the solution of the co-ordination compound and the bis(12-carboranylalkyl)ether synthesis carried out in the same solvent medium.

The acetylenic ether, and the bis(carboranylalkyl)ether reaction product may be symmetrical or asymmetrical. Ethers with straight aliphatic chains are preferred over those with excessively branched chains because of the greater probability of steric hindrance of reactions with the latter materials. Bis(carboranylalkyl)ethers derived from diacetylenic alkyl ethers with lower alkyl chains having from 1 to 4 carbons are particularly suitable for use in the present invention, and bis(12-carboranylmethyl) ether is preferred.

The organo-lithium compounds used in the method of the present invention are alkyl-lithium or aryl-lithium compounds such as butyllithium, ethyllithium, phenyllithium or other organo-lithium compounds known in the art and derived by replacement of a hydrogen atom of an alkyl or aryl compound by a lithium atom. The choice of the organo-lithium compound is not critical and is dependent on convenience of handling and economic factors.

The reaction between the bis(carboranylalkyl)ether and the organo-lithium compound suitably proceeds at room temperature (20°–30° C.), but is conveniently performed at temperatures below room temperature for ease in controlling reaction rate or maintaining volatile reactants or solvents in the convenient condensed form. The reaction may proceed between the reactants directly, or in solution in an organic solvent inert to the reaction. Conventional aliphatic, cycloaliphatic, and aromatic hydrocarbon and oxygenated solvents such as benzene, toluene, cyclohexane, hexane heptane, dioxane, ethers etc. can be employed, as will be evident to the skilled organic chemist. Because of the sensitivity of the organic-lithium compounds to hydrolysis, highest yields are obtained when anhydrous conditions are maintained, for example by exclusion of atmospheric moisture by operating in an atmosphere of an inert gas such as nitrogen, argon, or the like.

The reaction of the lithiated ether with an epoxy compound similarly suitably proceeds at room temperature, or below to permit better control. Volatile compounds such as ethylene oxide may be reacted in the gas phase, or as liquids when cooled below their boiling point, or in solution dissolved in an organic solvent inert to the reaction, like those solvents discussed earlier.

In all cases, the reactants are suitably maintained in contact for a time permitting substantially complete reaction. The reaction time is not critical, and will vary with the reaction temperature, concentration, etc. as is usual in chemical reactions.

The hydrolysis step may be performed, for example, by acidification with a variety of acids both organic and inorganic since the acid serves merely as a source of hydrogen ions. Hydrochloric acid is readily available and suitable to the method of the present invention; but, as known in the art, any acid which is a stronger acid than the weakly acidic alcohol can be used to displace the alcohol from its lithium salt.

Similarly, the oxidizing agents used to obtain the carboxyl derivatives may be selected from a larger number of oxidizing agents or mixtures thereof known to the art for oxidizing alcohols. Potassium dichromate and sulfuric acid are particularly convenient in laboratory scale operations, but equivalent materials are suitable.

In order to point out more fully the nature of the present invention, the following specific examples are given as illustrative embodiments of the present process and products produced thereby.

EXAMPLE I

A solution of 36 grams of bis(12-carboranylmethyl) ether in 1000 ml. of sodium-dried diethyl ether was prepared and chilled in an ice-water bath. To this solution, 150 ml. of a 1.5 M solution of butyllithium in pentane-heptane were added. Thereupon a cold solution (0° C.) of 13 grams of ethylene oxide in 250 ml. of anhydrous diethyl ether was added dropwise. The reaction mixture was allowed to stand overnight, after which it was treated with dilute aqueous hydrochloric acid and extracted with diethyl ether. The ether portion was dried and the ether removed under vacuum. The residual material was recrystallized from ether-pentane. A solid product was obtained which was dried under vacuum at 80° C. This material was identified as bis(12-β-hydroxyethyl-11-carboranylmethyl)ether. It had a melting point of 126°–128° C.

EXAMPLE II

A solution of 33 grams of bis(12-carboranylmethyl) ether in 400 ml. of dry ether was treated with 270 ml. of an ether solution containing 0.24 mole of phenyllithium. This mixture was then treated with 18 grams of liquid ethylene oxide at −10° C. and stirred for 18 hours at room temperature. After acidification with an inorganic acid at a temperature of about 0° C., the mix was extracted with ether. A solid residue remained after the extraction. The residue was fractionally crystallized from a mixture of ether and pentane. Ten grams of bis(12-β-hydroxyethyl-11-carboranylmethyl)ether, of melting point 125°–128° C. was obtained. After drying under vacuum at 85° C. for 24 hours, the melting point was found to be 128°–129° C.

EXAMPLE III

A slurry prepared from 45.5 grams of potassium dichromate, 85 ml. of 95% sulfuric acid and 50 ml. of water was added to a solution of 11 grams of bis(12-β-hydroxyethyl-11-carboranylmethyl)ether in 160 ml. of acetone. This addition was performed at such a rate that the temperature of the mixture remained below 20° C. After the addition was completed, the reaction mix was stirred for three hours at 0° C. after which it was extracted with diethyl ether. The ether extracted was washed with water and dried over a desiccant. Then the ether was removed under vacuum. The residue thus obtained was recrystallized from benzene-acetone to give 14 grams of bis(12-carboxymethyl-11-carboranylmethyl) ether. The material had a melting point of 242°–244° C.

It is of course to be understood that the foregoing examples are intended to be illustrative and that numerous changes can be made in the ingredients, proportions and conditions set forth therein without departing from the spirit of the invention as defined in the appended claims.

We claim:

1. A carboranyl compound of the formula $$[HO(CH_2)_m C_2 B_{10} H_{10} (CH_2)_n]_2 O$$

where $m$ is an integer from 2 to 5 inclusive and $n$ is an integer from 1 to 4 inclusive.

2. A carboranyl compound of the formula $$[HO(CH_2)_m C_2 B_{10} H_{10} (CH_2)_n]_2 O$$

where $m$ is an integer from 2 to 4 inclusive and $n$ is an integer from 1 to 2 inclusive.

3. Bis(12-hydroxyethyl-11-carboranylmethyl) ether of the formula $$(HOCH_2 CH_2 C_2 B_{10} H_{10} CH_2)_2 O$$

4. A carboranyl compound of the formula $$[LiO(CH_2)_m C_2 B_{10} H_{10} (CH_2)_n]_2 O$$

where $m$ is an integer from 2 to 5 inclusive and $n$ is an integer from 1 to 4 inclusive.

5. A carboranyl compound of the formula $$[HO_2 C(CH_2)_m C_2 B_{10} H_{10} (CH_2)_n]_2 O$$

where $m$ and $n$ are integers from 1 to 4 inclusive.

6. Bis(12-carboxymethyl-11-carboranylmethyl) ether of the formula $$(HO_2 CCH_2 C_2 B_{10} H_{10} CH_2)_2 O$$

(References on following page)

References Cited by the Examiner

UNITED STATES PATENTS

| | | | |
|---|---|---|---|
| 2,183,853 | 12/1939 | Haussmann et al. | 260—531 |
| 2,525,672 | 10/1950 | Heilbron | 260—531 XR |
| 2,759,946 | 8/1956 | Cislok et al. | 260—297 |
| 3,028,423 | 4/1962 | Blumenthal | 260—533 |
| 3,109,858 | 11/1963 | Ager et al. | 260—537 |

OTHER REFERENCES

Wagner et al., Synthetic Organic Chemistry, John Wiley & Sons, Inc., New York (1953), p. 419.

LORRAINE A. WEINBERGER, *Primary Examiner.*
CARL D. QUARFORTH, REUBEN EPSTEIN,
*Examiners.*
L. A. SEBASTIAN, I. R. PELLMAN,
*Assistant Examiners.*